United States Patent [19]
Allen

[11] 3,849,723
[45] Nov. 19, 1974

[54] CONDUCTIVITY MEASURING METHOD AND APPARATUS

[76] Inventor: Gerald F. Allen, 532 Bucknell Ave., Claremont, Calif. 91711

[22] Filed: June 14, 1973

[21] Appl. No.: 370,157

Related U.S. Application Data

[63] Continuation of Ser. No. 61,738, Aug. 6, 1970, abandoned.

[52] U.S. Cl............... 324/30 R, 73/61 R, 204/195, 324/65 R
[51] Int. Cl. ......................................... G01n 27/42
[58] Field of Search ........ 324/29, 30 R, 30 B, 62 R, 324/65 R; 204/195; 73/61 R, 61.1 R, 61.1 C, 73/73; 338/34, 35

[56] References Cited
UNITED STATES PATENTS

| | | |
|---|---|---|
| 2,526,636 | 10/1950 | Colman............................ 324/65 R |
| 2,636,962 | 4/1953 | Bouyoucos........................ 324/65 R |
| 2,691,135 | 10/1954 | Wooding........................... 324/65 R |
| 2,729,099 | 1/1956 | Rosenthal......................... 324/65 R |
| 3,206,386 | 9/1965 | Kopito .............................. 324/30 R |

Primary Examiner—Michael J. Lynch
Attorney, Agent, or Firm—Bacon & Thomas

[57] ABSTRACT

Method and apparatus for measuring the electrolytic conductivity of a liquid wherein a dielectric sorption medium such as a sheet of dispoable filter paper is employed to conduct the liquid from an accessible, exposed portion of the sorption medium into operative contacting association between a pair of spaced, opposed contact electrodes for electrolytic conductivity measurement, the liquid constituent of interest being effectively isolated from unwanted solids by sorption separation mechanisms as the liquid is being transported through the sorption medium.

19 Claims, 10 Drawing Figures

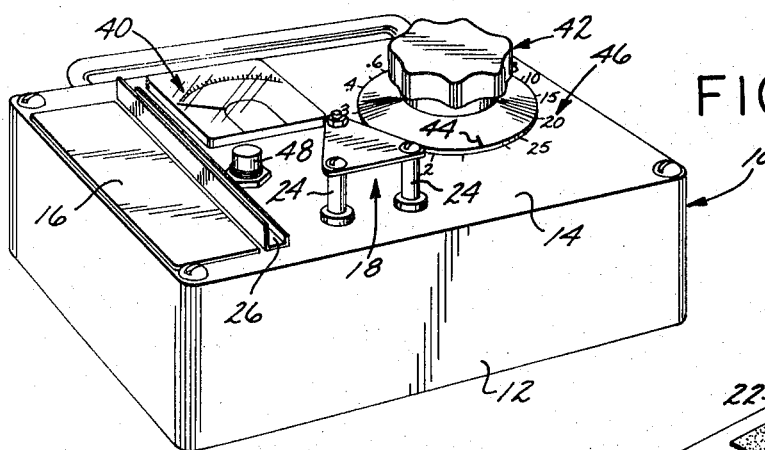

INVENTOR.
GERALD F. ALLEN
BY
Albert L. Gabriel
ATTORNEY

CONDUCTIVITY MEASURING METHOD AND APPARATUS

This is a continuation of application Ser. No. 61,738, filed Aug. 6, 1970 and now abandoned.

BACKGROUND OF THE INVENTION

Conventional methods and apparatus for measuring the electrolytic conductivity of various homogeneous and heterogeneous samples in industrial and research applications are, in most instances, unduly time-consuming, cumbersome and inefficient. An example is the established procedure and apparatus employed for evaluating the salinity of soil samples by electrolytic conductivity measurements.

Some analytical techniques which do not conventionally include electrolytic conductivity measurements, as for example chromatographic analysis techniques, could be improved and made more meaningful with the use of electrolytic conductivity tests employed in conjunction therewith. However, current methods and apparatus for measuring electrolytic conductivity are completely incompatible with such analytical techniques, and are therefore not employed.

Prior art methods for measuring soil salinity involved mixing a selected sample of soil with water so that soil salts became dissolved in the water, then filtering the mixture to remove all but the smallest dispersed particles from the liquid-enclosing phase of the sample, and then measuring the electrolytic conductivity of the filtrate by means of a standard immersible conductivity cell and associated conductivity bridge instrument.

Electrolytic conductivity is actually a measure of the electric current conducting capability of all ions and charged particles in the solution or dispersed system under test, and since the significant charged particles in soil are ions of salts, electrical conductivity is considered to be a meaningful measure of soil salinity. Accordingly, soil salinity is registered in units of conductivity, generally in millimhos per centimeter (mmhos/cm.), which is the practical order of magnitude of conductivity for such soil-water mixture filtrates.

A variety of empirically established formulas have been used in the past for preparation of the soil-water samples, calling for water-to-soil ratios by weight of from 1:1 to 10:1. Currently, the United States Soil Salinity Laboratory has accepted the "saturation extract" technique as standard. A saturation extract is prepared by adding distilled water to a sufficient sample of soil, such as from about a cupful to about a pint, until the soil particles are thoroughly wetted, and until the soil-water paste takes on a "malted milk" consistency. The end point is reached when the top surface just flows. While this end point criterion is obviously variable for different samples and different operators, resulting probable error is considered to be within about 10%.

This saturated paste sample is then subjected to vacuum filtration so as to extract the sample liquid from the dispersed phase (soil particles, foreign matter, and the like), the resultant filtrate being termed a "saturation extract," which is assumed for the purpose of the test to be a solution that is free of dispersed particles. Soil particles in unfiltered pastes and soil-water mixes, found to exhibit quasi-ionic behavior, are thus presumed eliminated, and the conductivity of the filtrate is considered to be indicative of the ions that are in solution. The conductivity measurement is then made on the saturation extract by means of a standard immersible conductivity cell and associated conductivity bridge instrument.

A major disadvantage of such current and prior art methods for testing soil salinity is that the vacuum filtration step requires substantial laboratory facilities, such as a vacuum pump, Buchner funnel, and flask. Thus, conventional and prior art procedures and equipment require that soil samples be selected, packaged, and identified in the field, and then brought back to the laboratory for testing, which customarily involved about 8 to 24 hours.

Another problem in conventional and prior art soil salinity testing methods and apparatus was that each sample of soil to be tested was quite large, on the order of between a half-pint and a pint, in order to produce a sufficient quantity of the soil-water filtrate or saturation extract for testing with the standard immersible conductivity cell. Thus, when a number of soil samples were to be tested, there was an unduly large amount of bulk that had to be packaged, transported, and then handled in the laboratory. The large bulk of each sample also causes a considerable amount of time to be required in making the saturation paste, thereby further reducing the efficiency of the system.

In addition to such handling problems which make current soil testing practices unsuitable for field use, and impractical from the standpoint of time and effort required, the vacuum filtration step that is used appears to introduce substantial inaccuracy into the resulting measurements by forcing fine dispersed particles into the filtrate that is to be measured, thus rendering the filtrate subject to the quasi-ionic effects of these particles. It appears to the applicant that the resulting salinity readout may, in many instances, thereby be substantially higher than the actual salinity of the solution that is assimilated into the roots of the plants grown in such soil.

Chromatographic analysis is one example of a technique which does not lend itself to electrolytic conductivity measurements according to current practices for making such measurements, but wherein the information obtained in the analysis could be substantially enhanced by combining electrolytic conductivity measurements with the information currently obtained from the band or strata positioning in chromatographic sorption columns. The nature of a chromatographic sorption column precludes the use of the conventional immersible conductivity cell and associated conductivity bridge instrument in combination therewith.

SUMMARY OF THE INVENTION

In view of these and other problems in the art, it is an object of the present invention to provide a novel method and apparatus for measuring electrolytic conductivity wherein a dielectric sorption medium is employed for gathering the liquid constituent of interest, transporting the liquid constituent to the region of opposed conductivity measuring electrodes, filtering unwanted solids from said liquid during the sorption transport operation, and supporting the said liquid in operative disposition between the contact electrodes during the electrolytic conductivity measurement.

According to the invention, a strip of dielectric sorption material, as for example a strip of filter paper, is exposed at one portion thereof, with another portion thereof extending between a pair of spaced, opposed contact electrodes through which electrolytic conductivity is measured, the spacing between the electrodes being determined either by the thickness of the strip of sorption material, or by independent supporting means. A small sample of the material to be tested, such as a saturated paste soil-water sample, or drops of water or other liquid, is placed on the exposed portion of the sorption material. The liquid-enclosing phase of the sample is "drawn" into the sorption strip by sorption mechanisms (such as absorption, adsorption, capillarity, and the like). This may be considered as the gathering phase of the method. A sufficient amount of the sample is placed on the sorption strip to enable the strip to become saturated with the liquid. These same sorption mechanisms cause the gathered liquid to be transported from the exposed gathering portion of the sorption strip along the strip into the portion of the sorption material that is disposed between the contacting electrodes, and the body of the sorption material that is disposed between the electrodes serves to support the liquid in contact with the opposed electrode surfaces.

Separation of the liquid-enclosing phase from the main body of solids, as in soil testing, is accomplished during the gathering part of the operation. However, filtration of unwanted dispersed particles and compounds from the liquid-enclosing phase is accomplished during transport, and this filtration is by an entirely different mechanism than conventional filtration. Thus, with the present invention, filtration is by a controlled surface transport or sorption mechanism in a longitudinal direction in the filter paper or other sorption material, whereas conventional filtration is by mechanical screening or sieving transversely through the filter paper or other filtering medium.

With the liquid constituent of interest from the sample thus gathered, transported, filtered, and supported between the opposed electrodes, the electrolytic conductivity measurement is made by energization of a conductivity bridge instrument operatively connected to the contact electrodes, as for example an A–C conductivity bridge or phase detector circuit.

Accordingly, it is another and more general object of the present invention to provide a novel electrolytic conductivity measuring method and apparatus which requires only a very small sample of the material to be tested, and which does not require vacuum or other separate filtration process, or a separate filtered body of liquid to be tested.

Another object of the invention is to provide a method and apparatus of the character described which is adaptable to a compact portable testing unit suitable for quickly testing small samples of soil or other material in the field, thus completely eliminating the necessity for gathering samples and bringing them into the laboratory for testing.

A further object of the invention is to provide an electrolytic conductivity measuring method and apparatus of the character described which is adaptable for use in conjunction with a chromatographic sorption column so as to improve identification of organic substances that are separated in the column.

Further objects and advantages of the present invention will appear during the course of the following part of the specification, wherein the details of construction, mode of operation, and novel method steps comprising presently preferred embodiments of the invention are described with reference to the accompanying drawings, in which:

BRIEF DESCRIPTION OF THE DRAWINGS

FIG. 1 is a perspective view of a portable electrolytic conductivity measuring device made in accordance with the present invention, and particularly adapted for testing small soil samples, the device being illustrated in FIG. 1 without the presence of the strip of sorption material, and with the upper, floating contact electrode assembly in storage position.

FIG. 2 is a view similar to FIG. 1, but with a strip of sorption material operatively disposed upon the fixed contact electrode plate and with the floating contact electrode assembly in its operative position with its contact electrode engaged against the exposed surface of the sorption strip.

FIG. 3 is a fragmentary perspective view further illustrating the operative relationship between the fixed and floating electrodes and sorption strip.

FIG. 9 is a functional diagram of the method and apparatus of the present invention.

FIG. 10 is a circuit diagram illustrating a simplified A–C conductivity bridge circuit particularly suitable for use in connection with the present invention.

DETAILED DESCRIPTION

Figure 4:
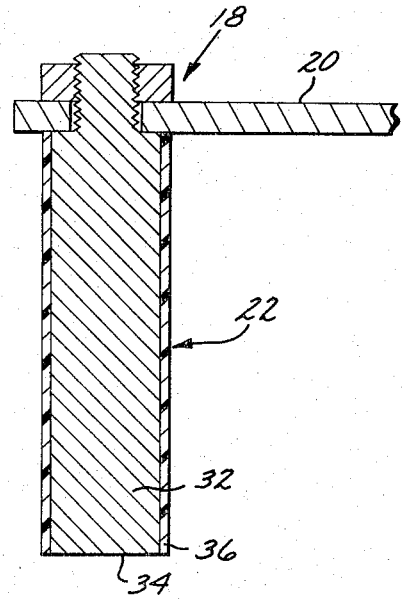
FIG. 4 is an enlarged, fragmentary vertical section taken on the line 4—4 in FIG. 2 illustrating details of construction of the floating contact electrode post.

FIGS. 1 to 5 illustrate a portable conductivity testing unit 10 which is particularly adapted for making soil salinity tests. The testing unit 10 includes a housing 12 having a generally flat top wall 14 with a fixed, flat electrode plate 16 mounted thereon adjacent one end of the housing 12. The electrode plate 16 is composed of inert conducting material, such as gold plate, and is adapted to have a strip of test filter paper laid thereon.

A floating contact electrode assembly 18 includes a generally flat, triangular body 20 which has a floating contact electrode post 22 depending from one corner thereof, and a pair of contact legs 24 depending from the other two corners thereof, the floating electrode post 22 and contact legs 24 preferably being of substantially the same length. The two floating contact legs 24 are removably engageable in an elongated contact track 26 that is mounted on the top wall 14 of the housing in adjacent but electrically spaced relationship to the fixed electrode plate 16.

The electrical connection from fixed electrode plate 16 to the bridge circuit is diagrammatically illustrated in FIG. 3 as a conductor 28. The electrical connection from the floating contact electrode post 22 to the bridge circuit includes a path from the electrode post 22 to the body 20 of the floating contact assembly, which is a conductor, and thence through the contact legs 24 which are also conductors and the contact track 26 and a conductor 30.

Figure 5:
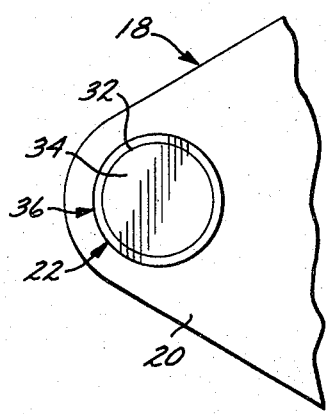
FIG. 5 is an enlarged, fragmentary bottom plan view looking from the bottom of FIG. 4.

The floating contact electrode post 22 includes an elongated body 32 having a flat contact surface 34 as best illustrated in FIGS. 4 and 5. The contact surface 34, like the exposed surface of the fixed electrode plate 16, is of inert conducting material such as gold plate. The floating contact electrode body 32 is covered except for the exposed flat contact surface 34 by an insulation coating 36. This limits the contact surface area of the floating contact electrode to the known surface area of the exposed flat portion 34, and surface phenomena tending to draw liquid up along the side portions of the contact electrode post 22 will not vary the actual contacting surface, and will accordingly not introduce error into the system.

Three storage receptacles 38 are disposed in the top wall 14 of the housing and are adapted to receive and engage the electrode 18 and contact legs 24 as illustrated in FIG. 1 when the portable testing unit 10 is not in use. On the other hand, when it is desired to utilize the testing unit 10, the floating contact electrode assembly 18 is simply removed from this storage position and disposed in the operative position illustrated in FIGS. 2 and 3 wherein the contact legs 24 are both disposed in the track 26 and the floating contact electrode post 22 rests against a sorption strip 39 disposed upon the fixed electrode plate 16.

The sorption strip 39 may be any sheet dielectric sorption material, the preferred sorption material having high ionic purity so that it will not contribute further ionization to the liquid that is being tested and thereby contribute error in the reading. One satisfactory type of sheet dielectric sorption material is filter paper, and a particularly desirable type of filter paper is chromatographic filter paper because of its high ionic purity.

Filter paper typically has a thickness on the order of about 1/100 of an inch, and regardless of whether or not the filter paper is saturated with water or other liquid, it has exceptionally good compressive structural rigidity and stability in the direction normal to its plane. Thus, with a substantially fixed, known thickness of the sorption strip 39, and with the flat lower end 34 of the floating contact electrode post 22 resting flush against the upper surface of the sorption strip 39, the electrode spacing and contact area (determined by the contact area of surface 34 of the floating electrode 22) are all known and fixed. This permits the testing unit 10 to be calibrated directly in units of conductivity, as for example millimhos per centimeter, rather than simply in units of resistance (ohms) which is the quantity that is actually determined by the associated conductivity bridge.

The portable conductivity testing unit 10 as illustrated in FIGS. 1 and 2 also includes a null indicating meter 40, and a null adjust knob 42 having an indicator 44 thereon which registers with an index 46 on the top wall 14 of the housing for direct conductivity readout, as for example in millimhos per centimeter when the knob 42 is adjusted for a null reading on the indicating meter 40.

Also disposed on the top wall 14 of the housing is an energizing switch 48 which is actuated to energize the electrical circuit for making a conductivity test.

Figure 6:
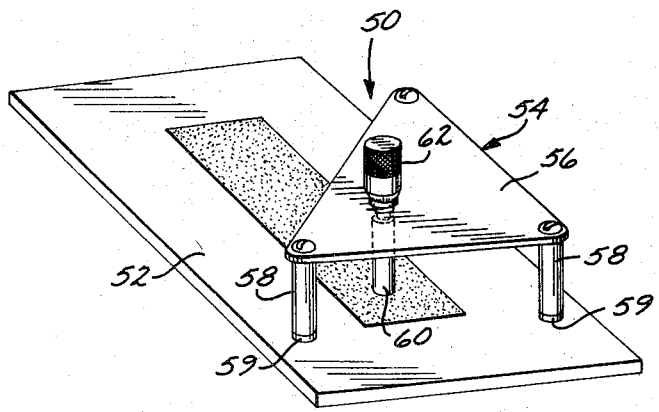
FIG. 6 is a perspective view illustrating alternative contact electrode apparatus suitable for use on a portable conductivity measuring device similar to that shown in FIGS. 1 and 2.
Figure 7:
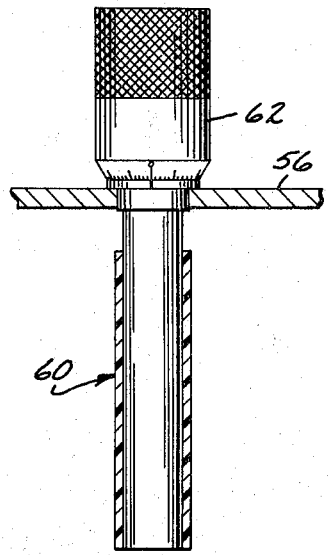
FIG. 7 is an enlarged, fragmentary, vertical section, partly in elevation, illustrating further details of the alternative embodiment shown in FIG. 6.
Figure 8:
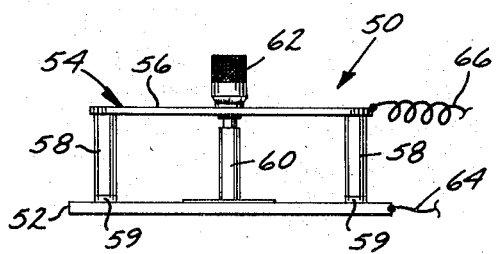
FIG. 8 is an elevational view of the alternative apparatus shown in FIG. 6.

FIGS. 6, 7, and 8 of the drawings illustrate alternative electrode apparatus generally designated 50 which includes a fixed electrode plate 52 that is somewhat wider than the fixed electrode plate 16 of FIGS. 1 to 3, and a modified floating contact electrode assembly 54 which permits independent spacing of the floating contact from the fixed electrode plate 52 and micrometric adjustment thereof regardless of the thickness and compressive rigidity of the sorption strip.

The floating contact electrode assembly 54 of the alternative electrode apparatus 50 includes a body 56 which is preferably generally triangular, and three fixed tripod legs 58 depending therefrom which are adapted to rest directly upon the fixed electrode plate 52 so as to provide a fixed positioning of the body 56 relative to the fixed electrode plate 52. The floating contact assembly body 56 is electrically insulated from the fixed electrode plate 52 by any suitable means, as for example by means of insulation feet 59 on the tripod legs 58.

Contact electrode post 60 depends from the body 56 of the floating contact assembly 54 intermediate the tripod legs 58, and is vertically adjustable by means of a micrometer adjuster 62 for adjustment of the electrode gap between the floating contact post 60 and the fixed electrode plate 52. Electrode connections to the bridge circuit of the testing unit include a connection 64 from the fixed electrode plate 52 and a connection 66 from the body 56 of the floating contact assembly 54, the body 56 being an electrical conductor and being in electrical communication with the floating contact electrode post 60.

FIG. 9 is a functional diagram which broadly illustrates the principles of the present invention as they apply to the taking of any electrolytic conductivity measurement. Thus, applications of the invention as diagrammatically illustrated in FIG. 9 include but are not limited to the testing of soil salinity, the testing of water salinity, and the testing of the electrolytic conductivity at any desired longitudinal position across a chromatographic sorption column to assist in the identification of various organics that become stratified in the column.

Referring to FIG. 9, the test sample is designated 68, and it may consist of a soil-water mixture that is placed upon the sorption material, drops of water that are dropped onto the sorption material, a receptacle containing a liquid composition having various organics therein, the liquid being in communication with a chromatographic sorption membrane or strip, or the like.

The sorption material in FIG. 9 is illustrated as a sorption strip or column 70 which communicates with the test sample 68 at a point spaced from the contact electrodes. The contact electrodes are designated 72 and 74 in FIG. 9, and these are of inert conducting material, such as gold plate, having known contact surface dimensions and being disposed at a desired longitudinal location along the sorption strip or column 70. In the case of the embodiment of the invention shown in FIGS. 1 to 5, the sorption strip or column 70 is generally rigid in the transverse dimension, having a substantially fixed transverse dimension which determines the spacing between the contact electrodes 72 and 74. However, in the case of the alternative embodiment of the invention illustrated in FIGS. 6 to 8, the sorption strip or column 70 need not be of known transverse dimension, and may be of somewhat softer material, since the spacing between the contact electrodes 72 and 74 is determined independently of the thickness of the sorption strip or column 70. It is only necessary that the sorption strip or column be in physical contact with the electrodes 72 and 74 so as to provide substantially complete wetting of the opposed surface areas of the contact electrodes 72 and 74 by the liquid that is being tested.

The contact electrodes 72 and 74 of FIG. 9 are electrically connected to a suitable conductivity detector circuit means 76 which may be an A–C conductivity bridge type detector circuit, or which may alternatively be a phase detector type of circuit such as a phase comparator or phase discriminator type circuit, all of which are null detection type circuits. It is to be understood, however, that null detection is not required in the present invention, and that any other type of conductivity detector circuit may be employed with the invention.

The data output instrumentation is diagrammatically illustrated as a block 78 in FIG. 9, and may consist of a simple null indicating meter such as the meter 40 shown in FIGS. 1 and 2, a recording instrument, a computer input, or other suitable instrumentation.

In the diagrammatic illustration of FIG. 9, the electrodes 72 and 74 are shown as two spot type electrodes of identical size. This arrangement constitutes the electrical equivalent of a small spot type electrode such as the electrode post shown in FIGS. 1 to 8 on one side of the sorption strip or column and a large plate-type electrode as shown in FIGS. 1 to 8 on the other side of the sorption strip or column. However, in an application of the present invention to a chromatographic sorption column, two spot type electrodes such as electrodes 72 and 74 illustrated in FIG. 9 would preferably be employed, the electrodes being disposed in aligned, opposed relationship on opposite sides of the chromatographic sorption column at particular levels on the column, if further identification of isolated organic materials is desired.

FIG. 10 is a circuit diagram illustrating a simplified A-C conductivity bridge circuit arrangement adapted to give a direct conductivity readout by null detection. The circuit may be made in very compact form and can be powered by a pair of "C" size 1-½ volt cells, and hence is well suited to a small, compact portable conductivity testing unit such as the unit 10 shown in FIGS. 1 and 2. While any existing high frequency A–C conductivity bridge design can be employed in connection with the invention, the particular circuit arrangement results in a bridge that is not only compact but minimizes error in the readout.

The A-C wave form is generated by means of an astable or free-running multivibrator 80 that is powered by D-C source 82 through energizing switch 84 which, in the case of the testing unit 10 shown in FIGS. 1 and 2, would be the switch 48. The multivibrator 80 consists of amplifier transistors 86 and 88 that are coupled together conventionally, and the output is through emitter-follower transistors 90 and 92 which provide the desired generator-load isolation, power gain, and impedance transformation.

Since the bridge circuit functions as a null detector, the waveform amplitude is not critical, except to the degree that it affects sensitivity. However, the present method and apparatus requires a different A-C frequency range than the conventional conductivity cell because of the narrow gap defined or required by the generally relatively thin strip sorption material employed with the invention. Thus, typical conventional conductivity cell designs employ an electrode separation gap on the order of from about 1/20 to about ½ inch, and the corresponding frequencies employed in the associated A-C conductivity bridges range from about 60 to about 10,000 hertz.

On the other hand, the filter paper type sorption strip material normally employed in the method and apparatus of the present invention defines an electrode gap on the order of about 1/100 inch. With this narrow gap polarization appears to be a much more critical factor due to near field effects and the like not apparent with the larger spacing of conventional conductivity cells. The preferred frequency range for the present invention is from about 20 kilohertz to about 120 kilohertz. A frequency much lower than 20 kilohertz appears to produce the aforesaid undesired polarization that tends to interfere with accuracy in the system, while a frequency much higher than about 120 kilohertz appears to introduce undesirable capacitance loading effects which also tend to interfere with the accuracy of the system.

The outputs from emitter-follower transistors 90 and 92 provide a near-symmetrical waveform that is coupled to bridge circuit 94 through a pair of coupling capacitors 96 and 98.

One arm of the bridge circuit 94 includes a resistor-thermistor network consisting of fixed resistor 100 and thermistor 102, having a resistance-temperature characteristic proportioned to that of representative electrolytes encountered in salinity or other conductivity measurements for which the testing unit is adapted to be used. The thermistor 102 is thermally and mechanically bonded to the underside of the fixed electrode plate 16 as is diagrammatically illustrated in FIG. 10 so that the temperature of the thermistor will be at or near the temperature of the sample being tested. In this manner, the testing unit is automatically temperature-compensated.

A variable resistor 104 forms the other arm of the bridge on the same side as the temperature compensating arm.

A third arm of the bridge that is generally designated 106 comprises the electrode-sorption strip arm of the bridge, wherein the fixed electrode plate 16, sorption strip 39, and floating contact electrode 22 are arranged in series.

The remaining arm of the bridge is the null adjust arm, and includes null adjust variable resistor 108, which, in the testing unit 10 shown in FIGS. 1 and 2 is varied by movement of the null adjust knob 42. The index 46 shown in FIGS. 1 and 2 that is associated with the variable resistor 108 is calibrated directly in millimhos per centimeter. The bridge arm containing variable resistor 108 also contains a trimmer resistor 110 which is included to modify the log characteristic of the variable resistor 108 to a log-log characteristic at low resistance settings (i.e., for high conductivity samples). This spreads out the otherwise logarithmically -compressed dial calibration marks. Trimmer resistor 110 is adjusted to give the best match possible between predetermined dial markings and the particular variable resistor 108 that is used (the variable resistor 108 preferably being a log potentiometer arranged as a resistor).

The null indicator is preferably a sensitive D-C microammeter 112 that is coupled to the bridge through a full-wave rectifier network generally designated 114. The microammeter 112 represents the null indicating meter 40 shown in FIGS. 1 and 2 of the drawings.

Although it is to be understood that the present invention is not limited to a particular circuit arrangement or particular circuit component values, the circuit that is illustrated in the diagram of FIG. 10, and the circuit component values there illustrated, have been employed in test apparatus to provide relatively accurate and consistent soil salinity readings. In the example illustrated in FIG. 10, the transistors 86, 88, 90, and 92 were each 2N706 transistors; the four diodes forming the full-wave rectifier network 114 were each 1N270 diodes; and the null adjust variable resistor 108 was a CCW log potentiometer. The floating contact electrode 22 in this example had a flat contact surface area 34 approximately 0.0123 square inches (the contact post 22 being a cylinder of ⅛ inch diameter).

The bridge is calibrated by placing a filter paper strip on the fixed electrode plate 16 and operatively engaging the floating contact 22 with the filter paper as illustrated in FIG. 2. Then, the filter paper strip is saturated with a saline solution of known conductivity, as for example 1.0 millimhos per centimeter. The energizing switch 84 in FIG. 10 (or switch 48 in FIGS. 1 and 2) is turned on, and the variable resistor 108 is adjusted by setting the null adjust knob 42 to the known conductivity, so that the indicator 44 reads such conductivity on the index 46. The variable resistor 104 is then adjusted for a null meter reading. After disposing of the used filter paper strip, and cleaning the electrode assembly, the salinity measurement is ready for another calibration check, or for actual testing use.

The conductivity testing unit 10 is employed for conducting a soil salinity test by first preparing a small amount of saturation-paste or other soil-water mix sample in accordance with standard practice. Typically, a teaspoon or less of soil may be readily mixed in a minute or two in a small (1 oz.) paper cup, with a coffee-stirrer stick. The prepared sample is then dabbed on the sorption strip 39 at a position spaced from the floating contact electrode 22, so that the liquid is "drawn" from the sample, saturating the filter paper or other sorption strip material and flowing under the floating contact electrode 22 so as to completely wet the contact surface 34 thereof and the complementary area of the fixed electrode plate 16.

Although the weight of the floating contact electrode assembly 18 is sufficient, preferably light finger pressure is applied to the floating contact 22 at its upper end to keep it against the sorption strip 39. Since the filter paper normally employed as the sorption strip medium has high compressive strength and stability, variations in applied pressure have little effect on accuracy. If the alternative micrometer adjust embodiment of the invention shown in FIGS. 6, 7, and 8 is employed, the micrometer 62 is adjusted to the proper predetermined setting for the electrode gap, in which case the gap will be determined by this micrometer setting instead of by the thickness of the filter paper or other sorption strip material as in the form of the invention shown in FIGS. 1 to 5.

The energizing switch 48 is then turned on, and the operator simply adjusts the null adjust knob 42 for minimum or null meter reading, which will be near zero, and then reads off the measured salinity value according to the position of the indicator 44 on the index 46.

The amount of soil required for the saturation paste sample is only that which is sufficient to cause the filter paper or other sorption strip material to become saturated, and a teaspoon of soil is generally quite adequate for this purpose. The filter paper or other sorption strip material is determined to be suitably saturated for conducting the test when water can be seen on the top thereof. By thus utilizing a saturation paste sample, the present invention in effect duplicates the saturation extract technique which is the U.S. Soil Salinity Laboratory's accepted standard procedure. However, with the present invention this technique is accomplished with only a teaspoon or less of soil rather than a half-pint to a pint; it is accomplished without the usual separate vacuum filtration step and corresponding requirement for laboratory facilities such as vacuum pump, Buchner funnel, and flask; filtration is more effective than conventional filtration because it is accomplished by a different type of filtration mechanism, i.e., a sorption transport filtration instead of a mechanical screening filtration; the soil-water samples can be mixed much more quickly because of the tiny sample that can be used; and tests can be performed in the field instead of requiring that samples be collected in the field and returned to the lab for test.

When a test is completed, the filter paper or other sorption strip and sample-mixing utensils may be discarded, and the electrodes washed with distilled water. The testing unit is then ready to perform another test.

Water samples are tested in generally the same manner as a soil sample is tested, except that no preliminary preparation of the sample is required, and drops of the water to be tested are simply dropped on the filter paper or other sorption strip material until the sorption strip is saturated. The salinity measuring procedure is then the same as for soil sample testing.

Although only a single sorption strip 39 is shown in FIGS. 2 and 3, it is to be understood that the fixed electrode plate 16 may be made considerably larger than that illustrated in FIGS. 1 to 3, to accommodate a series of separate sorption strips 39 that may be laid side by side. By this means, a series of soil or other samples may be placed upon the series of separate sorption strips simultaneously, and the floating electrode can be positioned sequentially over each test sorption strip to obtain data on a series of samples in a very short period of time.

While the instant invention has been shown and described herein in what are conceived to be the most practical and preferred embodiments, it is recognized that departures may be made therefrom within the scope of the invention.

I claim:

1. A method of measuring the electrolytic conductivity of a liquid constituent of a sample comprising the steps of:
   a. arranging a pair of conductivity measuring electrodes spaced from one another,
   be removably arranging a body of dielectric sorption material with a first portion thereof bridging said electrodes and a second portion thereof exposed externally to said electrodes, c. disposing said test sample in physical contact with said second portion of said body, d. substantially saturating said first portion of said body by sorption transporting a portion of said liquid constituent of the sample from said second portion to said first portion of said body whereby the transported liquid constituent is in physical and electrical contact with said electrodes, and e. measuring the conductivity of the transported liquid constituent bridging said electrodes.

2. A method as recited in claim 1 further comprising the step of filtering said portion of said liquid constituent of the sample before said portion reaches said spaced electrodes.

3. A method as recited in claim 1, wherein said conductivity measuring step comprises applying an AC signal to a null detection bridge circuit.

4. A method as recited in claim 3 comprising temperature compensating a leg of said bridge circuit for the temperature of said sample.

5. A method as recited in claim 3 wherein said AC signal is generated by an astable multivibrator.

6. A method as recited in claim 5 wherein the frequency of said AC signal is between 20 KHz and 120 KHz.

7. The method as defined in claim 1 including providing a gap of predetermined spacing between said electrodes.

8. The method of claim 7, wherein said predetermined spacing is established by the thickness of said body of dielectric material, the electrodes being disposed in direct physical contact with opposite sides of said sheet.

9. The method of claim 1, wherein the test sample is a mixture of soil and water, the measurement of the electrolytic conductivity of said transported liquid constituent therefrom providing a measurement of soil salinity.

10. The method of claim 1, wherein the test sample is water, said electrolytic conductivity measurement providing a measurement of the salinity of said water.

11. Portable apparatus for measuring the electrolytic conductivity of a liquid constituent of a test sample comprising:

a. a housing, b. first and second conductivity measuring electrodes having contact surfaces spaced from one another, c. said first electrode physically connected to said housing and having a contact surface exposed from said housing, d. means for supporting said second electrode on said housing adjacent said exposed contact surface of said first electrode, e. conductivity measuring means electrically connected to said electrodes and positioned in said housing, f. indication means connected to said conductivity measuring means and connected to said housing, g. a body of dielectric sorption material having a first portion thereof bridging said contact surfaces and a second portion thereof exposed externally to said contact surfaces, h. means for securing said first portion in physical and electrical contact with both of said contact surfaces, and i. means for supporting said second portion on said housing whereby a portion of said liquid constituent will be sorption transported through said body from said second portion to said first portion.

12. Apparatus as recited in claim 11 further comprising means for establishing a predetermined spacing between said electrode contact surfaces.

13. Apparatus as recited in claim 12 wherein said means comprises said body of sorption material in the form of a substantially incompressible sheet of substantially uniform thickness, the thickness of which determines the spacing of said electrodes.

14. An apparatus as defined in claim 11 wherein said spaced contact surfaces define a gap of a predetermined spacing.

15. An apparatus as defined in claim 11, wherein said conductivity measuring means comprises A-C conductivity bridge means including temperature responsive circuit component means directly thermally associated with at least one of said electrodes for automatic temperature compensation of the apparatus.

16. An apparatus as defined in claim 11, wherein said first electrode contact surface portion is generally horizontally disposed on said housing and faces upwardly, said means for supporting the second portion of the body comprising a generally horizontally extended portion of said first electrode having an upwardly facing support surface upon which said body of dielectric sorption material rests, said body comprising a sheet of sorption material adapted to receive the sample thereon.

17. An apparatus as defined in claim 16 wherein said second electrode is movable relative to said first electrode and has its said contact surface portion generally horizontally disposed and facing downwardly.

18. An apparatus as defined in claim 11, wherein said body of dielectric sorption material comprises a sheet of sorption material.

19. An apparatus as defined in claim 18, wherein said sheet comprises a sheet of clean filter paper.

* * * * *